United States Patent [19]

Jacob

[11] Patent Number: 4,688,895
[45] Date of Patent: Aug. 25, 1987

[54] L. C. SUNROOF PANEL WITH ADJUSTABLE SHADING

[75] Inventor: Keith D. Jacob, Ann Arbor, Mich.

[73] Assignee: C-D Marketing, Ltd., Ann Arbor, Mich.

[21] Appl. No.: 660,760

[22] Filed: Oct. 15, 1984

[51] Int. Cl.⁴ .................................................. G01F 1/13
[52] U.S. Cl. ..................................... 350/332; 350/580
[58] Field of Search ............ 350/332, 333, 580, 331 R, 350/407, 354; 362/321, 318, 2; 250/205, 215, 237 R, 237 G; 315/153, 154

[56] References Cited
U.S. PATENT DOCUMENTS 3,961,181  6/1976  Golden .......................... 350/331 R

*Primary Examiner*—Arthur G. Evans
*Attorney, Agent, or Firm*—Rhodes and Boller

[57] ABSTRACT

A shading system comprising a liquid crystal panel made up of individual zones. The panel is illustrated in application to a motor vehicle sunroof to provide selective shading of the interior of the vehicle passenger compartment. A control system is associated with the zones of the liquid crystal panel to develop particular shading patterns by the selective energization of particular zones. Manual controls may be used to establish the desired shading pattern, and an automatic control capability is also provided whereby once a desired shading pattern has been set by use of the manual controls, the automatic control can energize the appropriate zones as the relative position of the sun to the vehicle changes so that the same interior space as originally set continues to be shaded. A joy stick controls the position of the shade, a size potentiometer controls the size of the shade, and a density potentiometer controls the degree of opaqueness of the shade.

13 Claims, 19 Drawing Figures

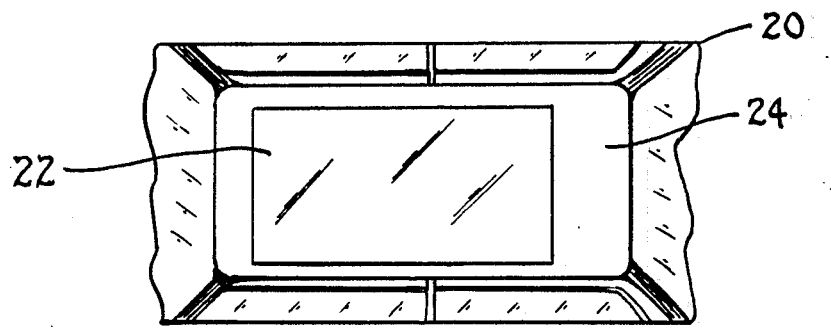
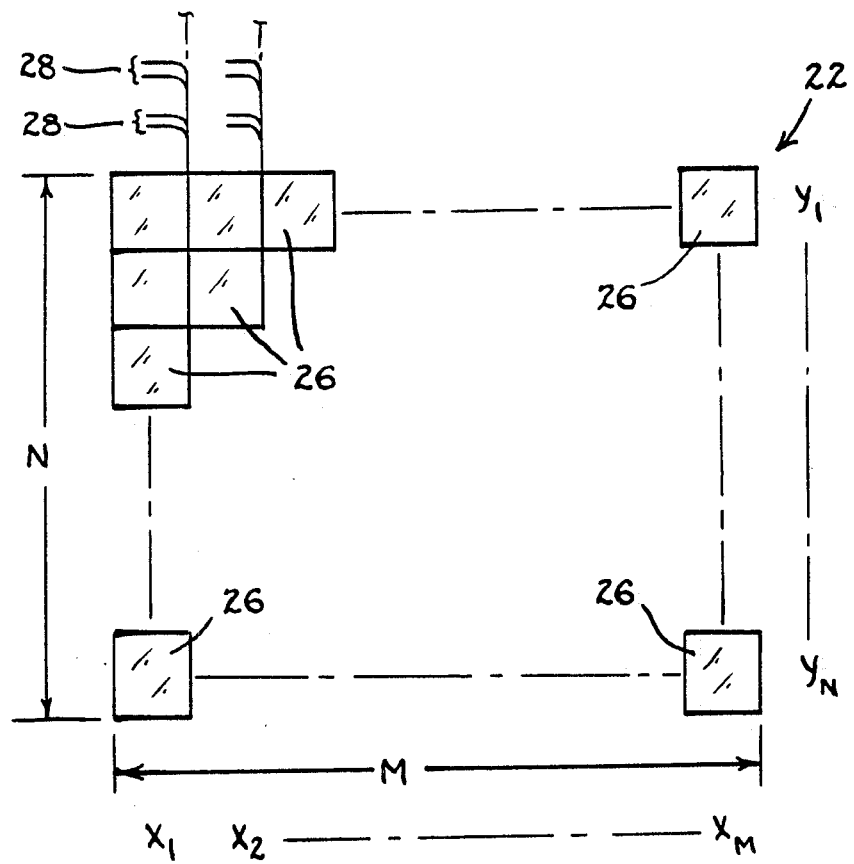

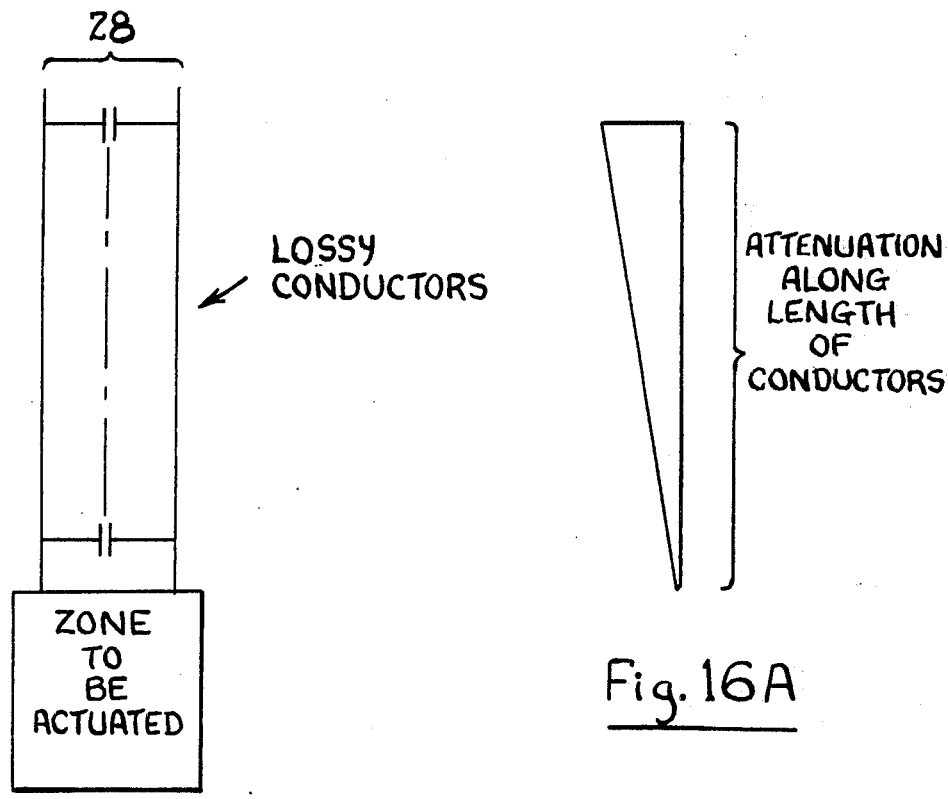

L. C. SUNROOF PANEL WITH ADJUSTABLE SHADING

BACKGROUND AND SUMMARY OF THE INVENTION

This invention relates generally to a shading system. More specifically the invention relates to a liquid crystal (L.C.) panel having zones which are selectively operable by an electronic control to various states of opaqueness to produce desired shading patterns.

Reference is made to application Ser. No. 527,435 filed Aug. 26, 1983, commonly assigned, which relates to a liquid crystal panel shade. The disclosure of that application relates to a liquid crystal sun visor for providing shading to the eyes of an occupant of an automobile.

The prior art referred to in that patent application identifies the following general categories of shading systems:

(1) Prismatic systems in which glare is reduced by prismatic elements having different indicies of refraction including liquid-containing prisms;

(2) Shutter systems in which mechanical shutters are selectively operable to control shading;

(3) Photochromic systems in which photochromic material responds to changes in incident light so as to increasingly darken in response to a higher intensity of light and to become less dark in response to a lower intensity of light;

(4) Tinted liquid systems in which tinting is controlled by tinted liquid pumped between window glass panes;

(5) Polarizer systems containing light polarizers.

There have also been previous attempts to apply liquid crystals to window panes.

The following prior art patents relate to these various categories: U.S. Pat. Nos. 3,324,469; 2,423,322; 3,400,972; 3,368,862; 3,695,681; 2,423,322; 2,562,895; 3,961,181; 3,986,022 and 4,268,126.

The invention of application Ser. No. 527,435 provides for control of the area of opaqueness of a liquid crystal panel sun visor and hence a control of a shaded area within the interior of the automobile. In the disclosed embodiment of a liquid crystal panel sun visor, the extent of the opaque zone is adjusted so as to provide shading of an occupant's eyes when seated in the vehicle.

The present invention is directed to a novel and unique liquid crystal panel shading system. The invention is disclosed in an illustrative form as a vehicle sunroof panel although it will be appreciated that principles of the invention may be applied to other applications. In the disclosed application of the invention in a sunroof panel, the liquid crystal is divided into a multitude of individual zones which are under the control of an electronic control system. The invention includes a control for selectively controlling the individual zones to desired degrees of opaqueness so as to provide a desired shading pattern within the vehicle.

One of the advantages of the invention is that substantial amounts of light may be allowed to pass through certain portions of the panel while other portions of the panel are controlled to block or at least attenuate the light transmission into the interior of the vehicle. Thus for example, it is possible for an individual occupant of the vehicle, say the driver, to sit in a shaded area while full light is allowed to pass through the panel onto other areas. Moreover, in the disclosed embodiment the shading pattern may be considered as analogous to an umbrella with a control handle provided for use by an occupant corresponding to the handle of an umbrella. The control handle is positioned (i.e. aimed) by the individual to position the shaded area of the panel in the same manner that an individual would use an umbrella's handle to position the umbrella, but without there being any mechanical connection. Moreover the disclosed embodiment has a provision for controlling the size of the opaque area and also for controlling the degree of opaqueness. Thus it is possible to expand and contract the size of the shade, to selectively position it, and to set its degree of opaqueness.

The present invention also includes another aspect of an automatic control for automatic control of the shade both with respect to opaqueness and position whereby once an occupant has set the desired area to be shaded and the intensity of shading, the automatic control is effective to maintain that area and degree of shading with respect to any changes in the relative position of the vehicle and the sun. In this way the system automatically tracks the sun as it moves across the sky and it also automatically adjusts for changes in the vehicle's direction of travel.

With the present invention in application to a vehicle sunroof panel, new opportunities are available to automobile stylists and designers. For the vehicle occupant it is possible to have desired levels of interior illumination yet to provide shading from direct sunlight at desired locations and in particular degrees. Therefore the invention provides a capability heretofore not available and which is susceptible to numerous possible implimentations.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a fragmentary top plan view of an automobile containing a sunroof panel embodying principles of the present invention.

FIG. 2 is an enlarged schematic top plan view illustrating detail of a representative construction of the sunroof panel.

11, 11A and 11B are respective illustrations of different possible operating conditions.

Figure 9:
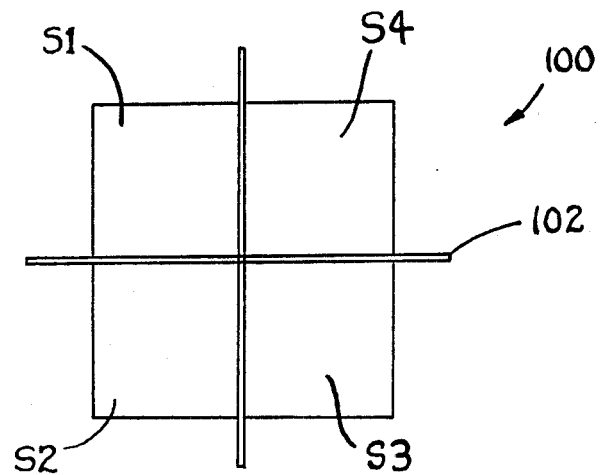
FIGS. 9 and 10 are top plan and frontal views respectively of a sensor which is associated with the control for automatic control of the sunroof panel, and FIGS.
Figure 10:
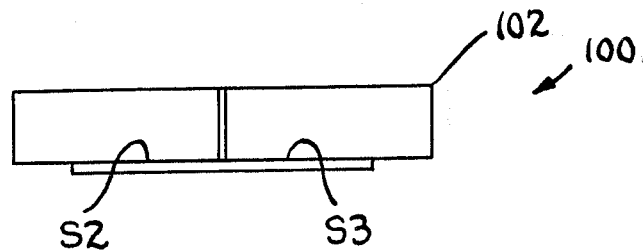
Figure 12:
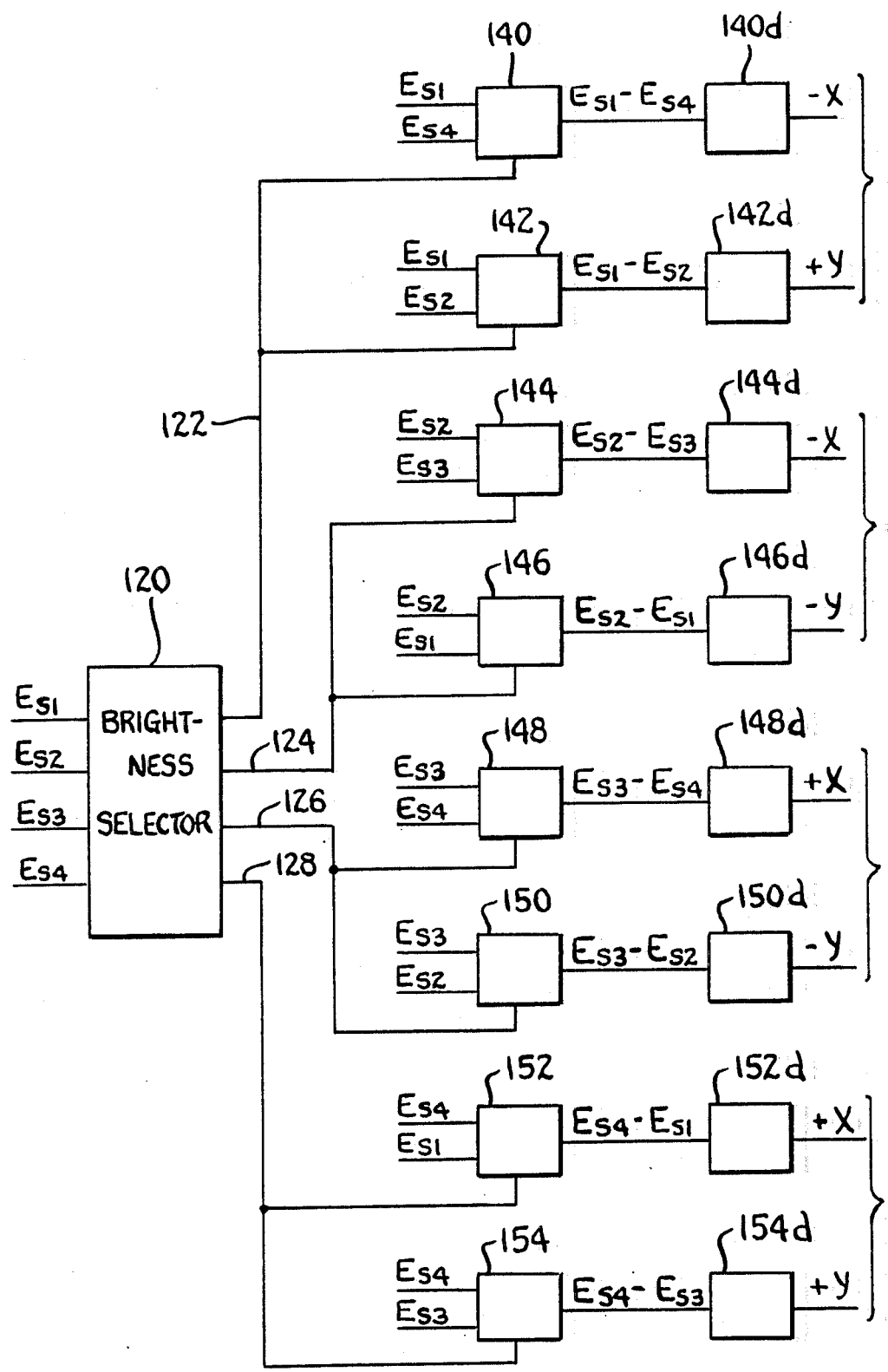

FIG. 12 is a schematic diagram of certain details of an automatic control used with the sensor of FIGS. 9 and 10.

Figure 13:
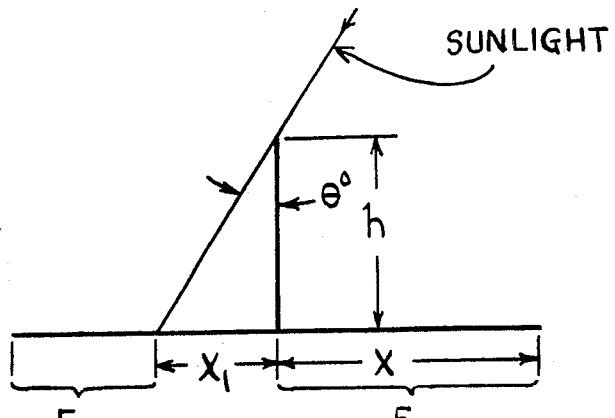

FIG. 13 is a diagram illustrating geometrical relationships involved in use of the sensor of FIGS. 9 and 10.

Figure 14:
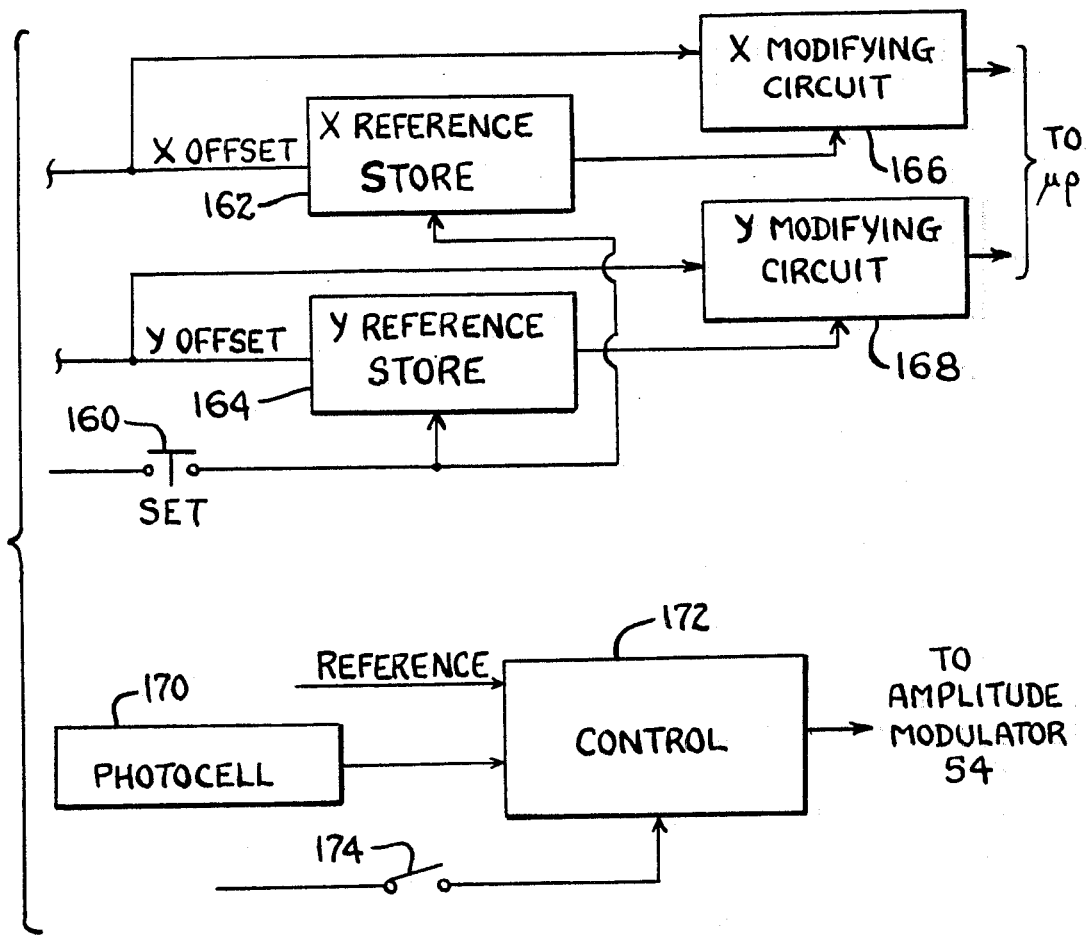

FIG. 14 illustrates part of a modified automatic control.

Figure 15:
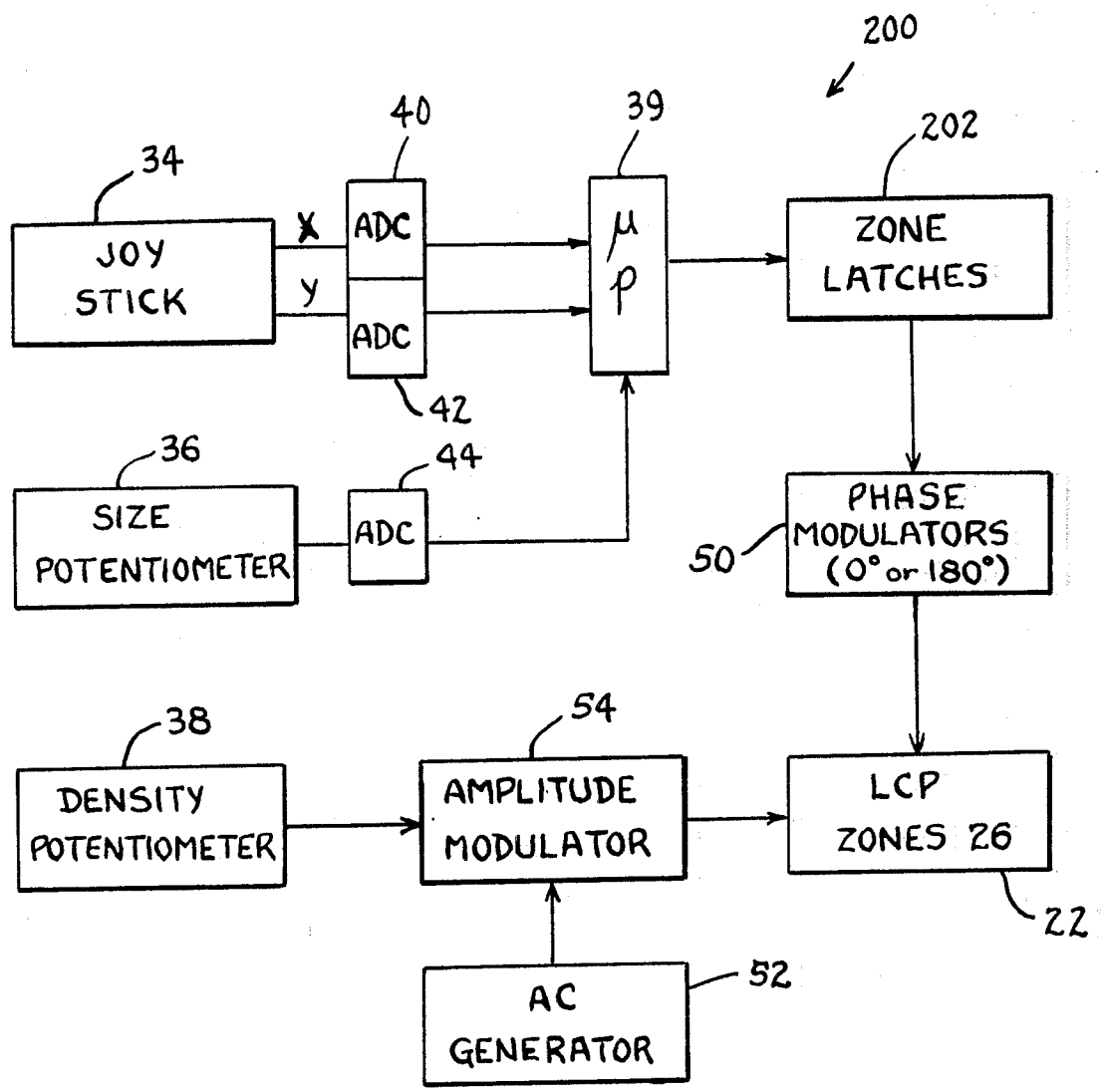

FIG. 15 is a block, diagram of an alternate form of control.

FIGS. 16 and 16A are respective diagrammatic illustrations of a further aspect which may be embodied in the sunroof panel to produce particular opaqueness characteristics.

DESCRIPTION OF THE PREFERRED EMBODIMENT

FIG. 1 illustrates application of the invention to an automobile 20 wherein a liquid crystal panel 22 forms a sunroof panel occupying a portion of the automobile's roof 24. The illustrated liquid crystal sunroof panel 22 is shown to have a generally rectangular shape with the length extending parallel to the vehicle's length and the width parallel to the width of the vehicle. The sunroof overlies the occupant area inside the automobile.

FIG. 2 illustrates detail of a representative construction for panel 22. The panel comprises an array of individual zones 26 which by way of example are illustrated as squares. While the zones are identified by the general reference numeral 26, each individual zone bears its own designation for purposes of explanation. Thus along the length of the panel there are a series of m number of zones while extending along the width are a series of n number of zones. Thus the illustrated embodiment comprises an m×n array of individual zones. Each of the individual zones 26 is individually controlled as well be seen from the ensuing description to provide various patterns of selective shading.

Conventional principles of liquid crystal panel fabrication may be used including the use of very thin transparent conductors for conducting electrical power to each of the individual zones 26. It will be appreciated that use of the phrase "liquid crystal" is in a comprehensive sense to include any media whose opaqueness may be varied by controlled application of electrical power to the media, typically over a range from transparent to fully opaque. Hence, nematics and dichroics are representative media.

Associated with each zone are two conductors via which electrical power may be conducted. While each pair of conductors is designated by the general reference numeral 28 it will be appreciated however that each pair of conductors 28 is associated with a particular one of the zones 26.

Figure 3:
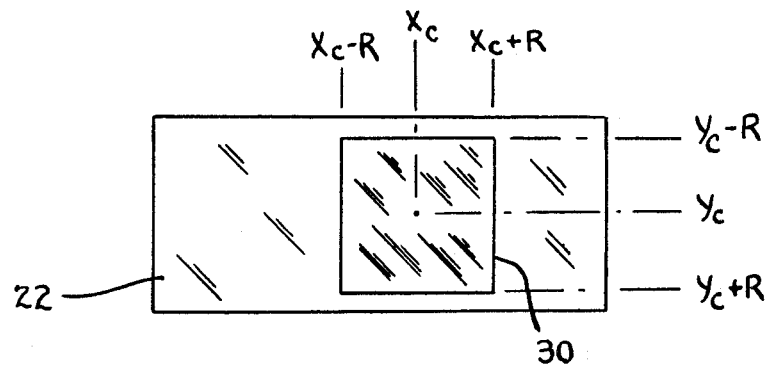
FIG. 3 is a schematic view illustrating a typical pattern of opaqueness which may be developed in the sunroof panel.

FIG. 3 illustrates an illustrative pattern of opaqueness 30 which may be developed in panel 22. This pattern is developed by energizing the appropriate individual zones 26 to form a square shape for pattern 30 at a particular location on panel 22. For purposes of illustration pattern 30 may be considered as extending lengthwise from a location defined as $X_c - R$ to a location defined as $X_c + R$ and widthwise from a location $Y_c - R$ to a location $Y_c + R$. The locations $X_c$ and $Y_c$ represent the center zone 26 of pattern 30, and R represents a given number.

Figure 4:
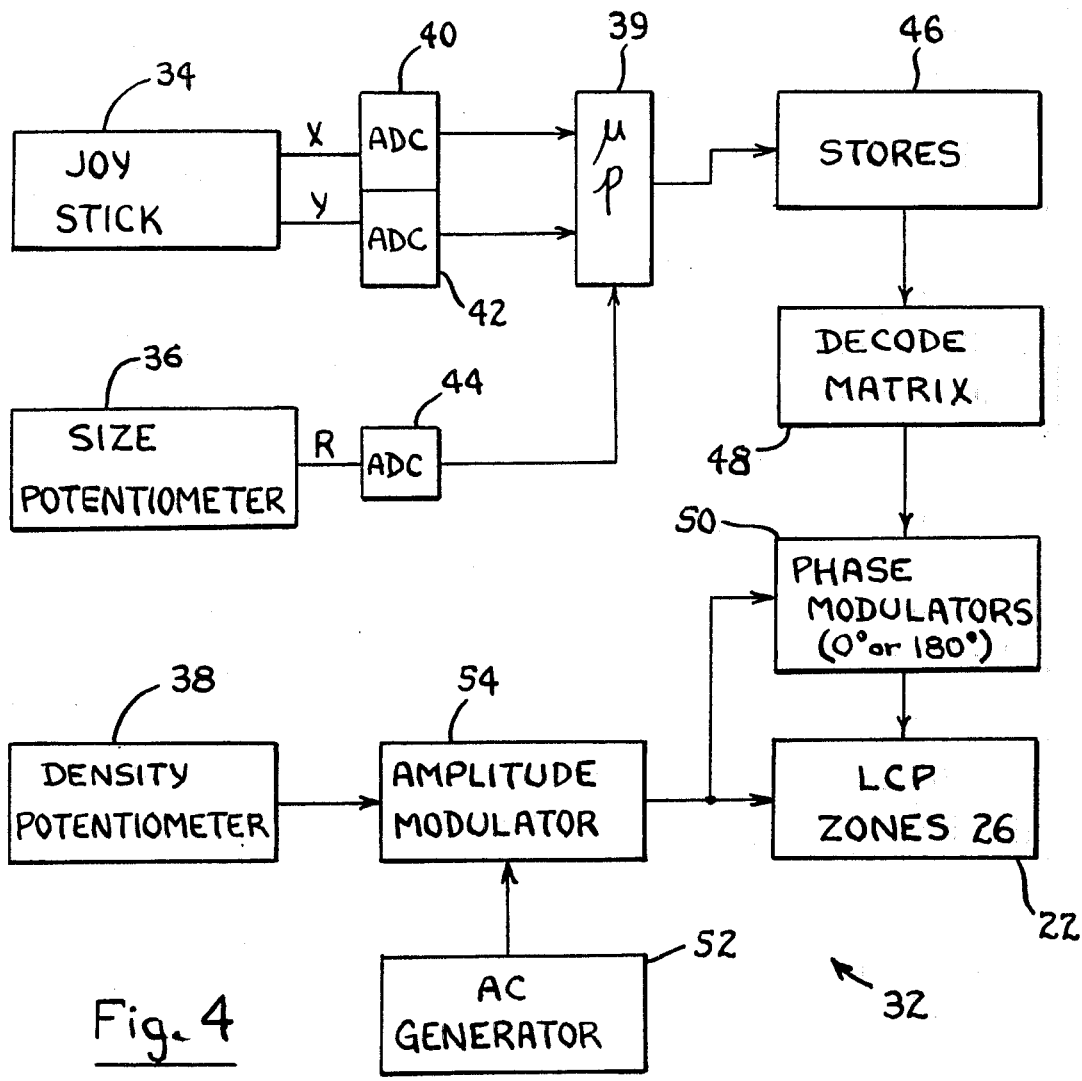
FIG. 4 is a general block diagram illustrating the control system associated with the sunroof panel.

FIG. 4 depicts a generalized schematic block diagram of the control system 32 which is associated with panel 22. Control system 32 comprises three inputs which are operator controlled. These are a joy stick input 34, a size potentiometer input 36, and a density potentiometer input 38.

The joy stick control 34 serves to control the center position of the opaque pattern 30 within the panel 22 while size potentiometer 36 controls the pattern's size. In other words the joy stick control 34 is effective to select $X_c$, $Y_c$ while size potentiometer 36 is effective to set the parameter R.

The joy stick and size potentiometer controls 34 and 36 are operatively associated with a microprocessor 39. Since microprocessor 39 operates on digital signals, it may be necessary to provide analog-to-digital converters 40, 42, and 44 associated with the joy stick and potentiometer controls, as shown, in the event that the joy stick and potentiometers do not provide a digital outputs directly themselves. As will become apparent, microprocessor 39 serves to set certain stores 46 which define the X and Y positions of those zones 26 which are to be energized to produce the opaque pattern. The stores are operatively associated with a decoding matrix 48 which in effect defines the intersections of the various X and Y positions set in the stores 46. Decoding matrix 48 is in turn associated with the liquid crystal zones 26 through corresponding phase modulators 50, one phase modulator per zone.

Energizing power is provided from any suitable source, an AC voltage generator 52 being illustrated. Density potentiometer 38 is operable to establish the degree of opaqueness of those individual zones 26 which have been selected for opaqueness by the control. The density potentiometer and voltage generator are cooperatively associated with an amplitude modulator 54 whereby the voltage which is supplied to the selected zones 26 will have an amplitude corresponding to the setting of the density potentiometer. The diagram of FIG. 4 shows the amplitude modulator to be coupled to both the phase modulators 50 and the individual zones 26. This technique is employed so that the amplitude modulated voltage from amplitude modulator 54 is applied at all times to one conductor of each pair of conductors 28. If an individual zone has been selected for energization, the amplitude modulated signal is phase shifted 180° by the corresponding phase modulator and supplied to the other conductor for that zone. For the zones which are not to be energized there is no phase shifting by the corresponding phase modulator and hence the same voltage phase is applied to both conductors of each zone whereby no differential is created across the corresponding zone and hence it remains transparent in the case of nematic media for the L.C.

Figure 5:
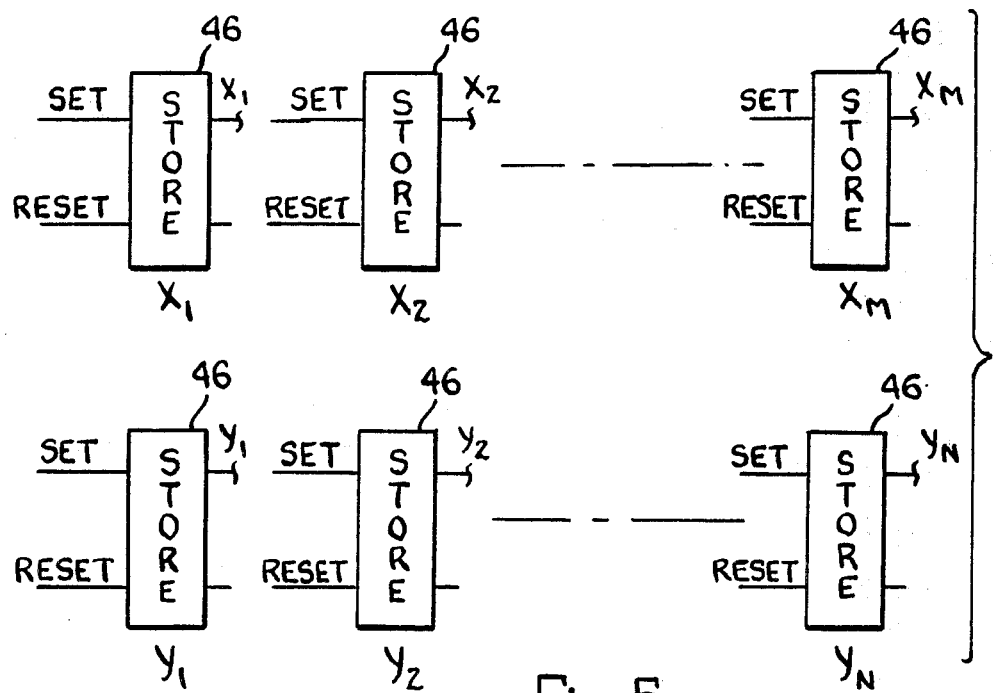
FIG. 5 is a schematic diagram illustrating detail of a portion of the diagram of FIG. 4

The stores 46 comprise a series of m+n stores. For zones to be energized along the x direction, the corresponding x stores are set and for zones along the y directions to be energized, the corresponding y stores are set. FIG. 5 shows details representative of the stores.

Figure 6:
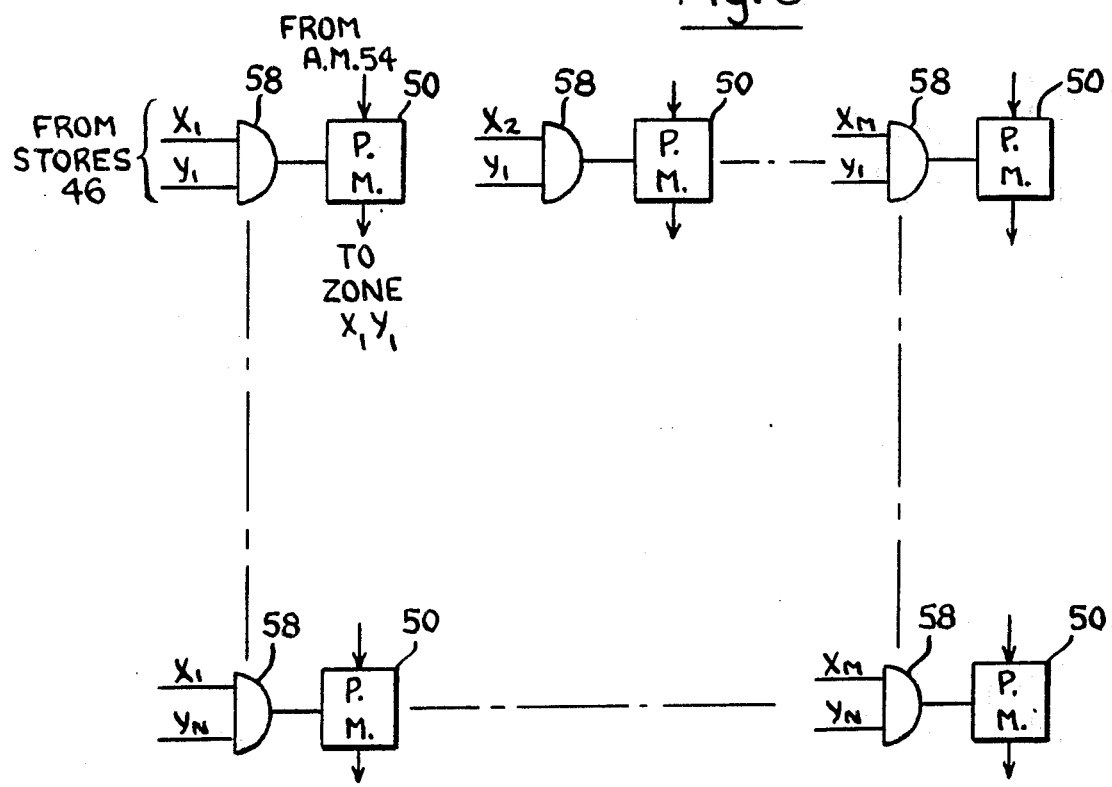
FIG. 6 is a schematic diagram illustrating detail of another portion of the diagram of FIG. 4.

Decoder matrix 48 decodes the set stores 46. As can be seen in FIG. 6 which shows details of the decoder, the decoder serves to define the intersections of the set x and y stores. For example, an ANDgate 58 is associated with each of the zones 26, and each ANDgate has two inputs, one from the corresponding x store for zone and one from the corresponding y store. When both inputs to an ANDgate come from stores which are set, the output of the ANDgate is effective to cause the corresponding zone to be energized. In this way the decoding friction is performed whereby all intersections of those stores which have been set will be energized to produce opaqueness. FIG. 6 illustrates further detail of a corresponding phase modulator 50 for each of the zones 26.

Figure 7:
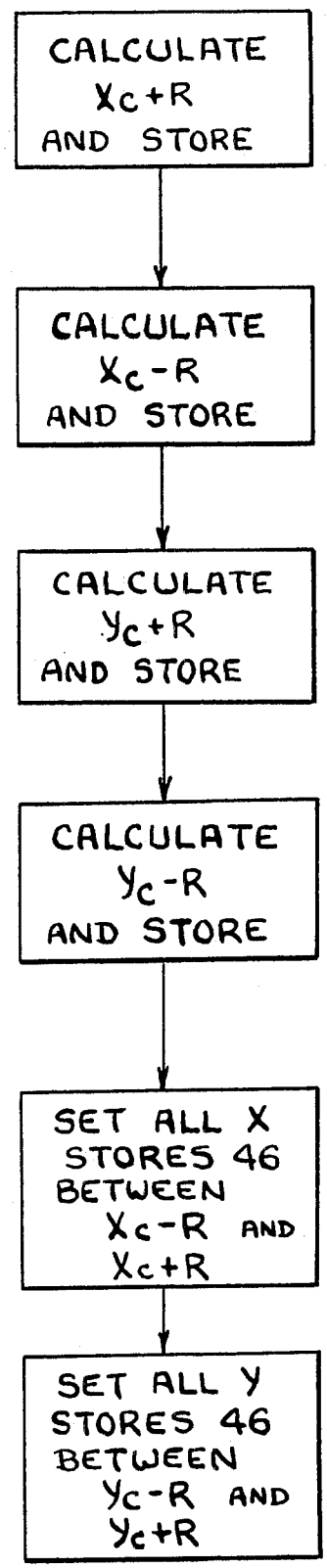
FIG. 7 is a flow diagram representing computations carried out by the control.

FIG. 7 illustrates a flow diagram for microprocessor calculations. The signal received from the joy stick provide a center position in terms of X and Y locations for the center zone 26 of pattern 30. These are identified by $X_c$ and $Y_c$ respectfully. The size potentiometer provides a signal representative of the size. For convenience this is identified by the letter R and it represents a number of zones which are to be opaque on each side of the center zone. Hence the flow diagram shows the following calculations to be performed $X_c+R$, $X_c-R$, $Y_c+R$ and $Y_c-R$.

The control sets all of the X stores between $X_c-R$ and $X_c+R$ and all Y stores between $Y_c-R$ and $Y_c+R$. With this setting of the appropriate stores in the decoder, the appropriate phase modulators are operated to produce the opaqueness pattern centered at $X_c Y_c$ and having length and width distances equal to $2R+1$ number zones. Whenever the joy stick control is operated to a different position a new calculation is performed in the same manner. Hence the operation of the joy stick will be effective to establish the position of the center of pattern 30 on the liquid crystal panel 22 whereby the position of the shading is controlled by the position of the joy stick. Similarly if the size is changed by operator adjustment of size potentiometer 36, a new calculation is performed to either expand or contract the size of pattern 30 depending upon the direction of operation of the size potentiometer.

Operation of density potentiometer 38 goes toward changing the degree of opaqueness and not the position of the opaqueness pattern. Hence when the density potentiometer is operated, it is unnecessary for the microprocessor to perform a new calculation since the joy stick and size potentiometer inputs have not been changed. Thus with the invention it is possible for an occupant of the automobile to set the size and location of the opaqueness pattern in the sunroof panel so as to produce a desired shading pattern on the interior of the vehicle, with the degree of opaqueness and location of the shaded area being set as desired.

Figure 8:
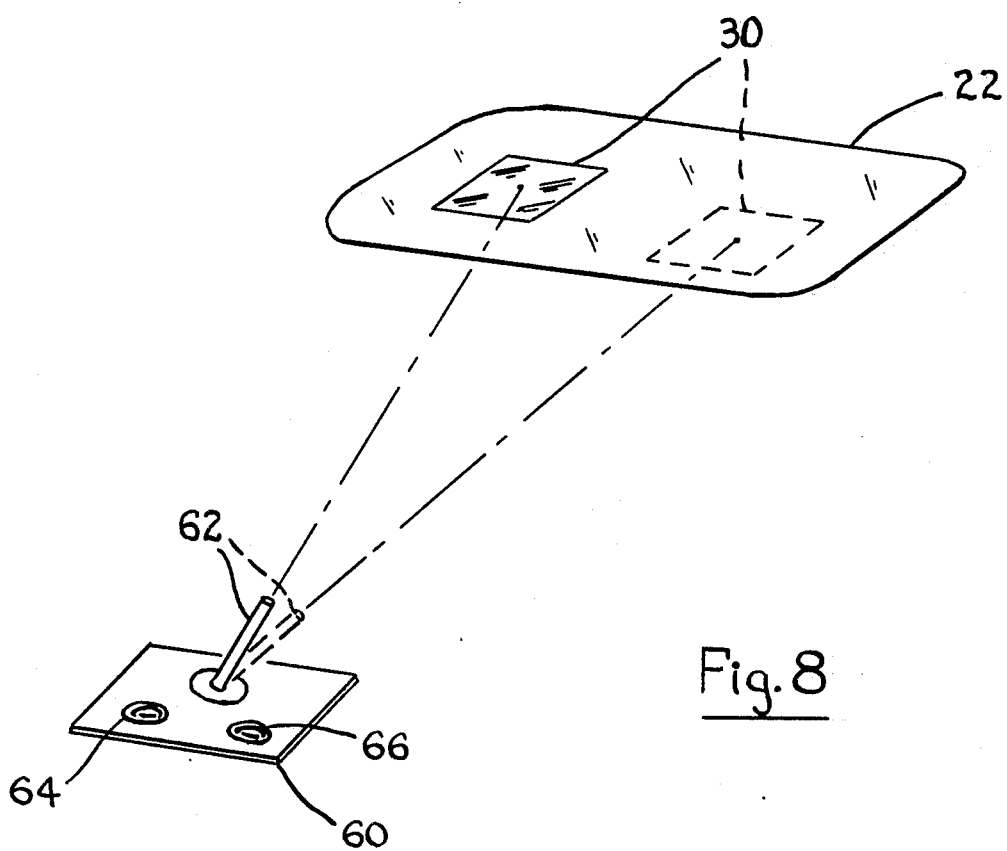
FIG. 8 is a fragmentary perspective view illustrating operation of the sunroof panel.

A particularly convenient aspect of the preferred embodiment of the invention results from the relationship of the joy stick control to the position of the opaqueness pattern. This is illustrated in FIG. 8 which shows a control panel 60 containing a handle 62 for the joy stick and also containing operators 64, 66 for the size and density potentiometers. The joy stick handle 62 is so positioned in relation to the opaqueness pattern on the roof that the joy stick handle points toward a given point of the shading pattern, specifically in the illustrated embodiment to the center point. Thus in effect the joy stick handle may be analogized to the handle of a parasol or umbrella which controls the position of the parasol or umbrella.

The invention can also embody an automatic control capability. In order to provide automatic control with reference to the relative position of the automobile and the sun, a sun position sensor is utilized.

FIGS. 9 and 10 illustrate plan and frontal views respectively of a sun sensor 100. The illustrated construction comprises four solar cells S1, S2, S3 and S4 each of which is square and with the four cells being disposed to form four quadrants of a larger square. The four solar cells are separated by a narrow opaque crossed fence 102 in which the sections of the fence are arranged at right angles and with the fence being perpendicular to the plane of the solar cells. The solar cells are disposed in a plane parallel to the ground.

Figure 11:
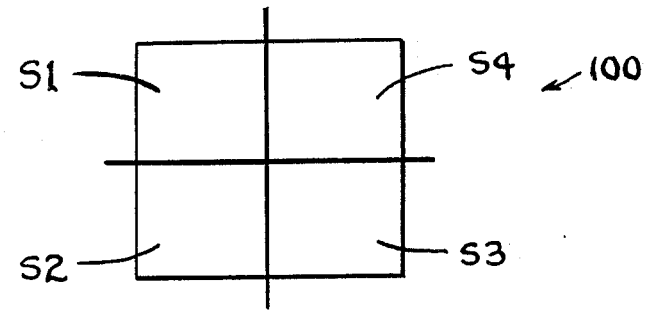

When the relation between the sun and the sensor is other than the sun being at the zenith, there will be a preferential shading pattern imparted to the solar cells by virtue of the fence. When the sun is at the zenith each of the solar cells will be uniformly illuminated, and this condition is represented by FIG. 11. However with the sun at the other than the zenith there will only be one, or at most two of the individual solar cells which are completely illuminated.

Figure 11A:
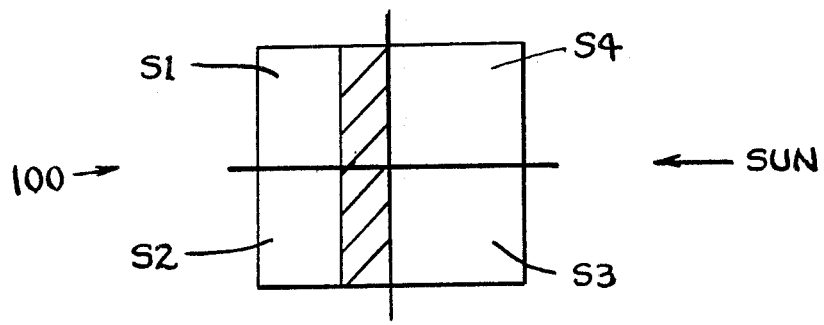

FIG. 11A illustrates the effect when the sun is not at the zenith, but wherein the sun's rays are parallel to one of the fence sections causing the two solar cells which are nearer the sun to be equally illuminated.

Figure 11B:
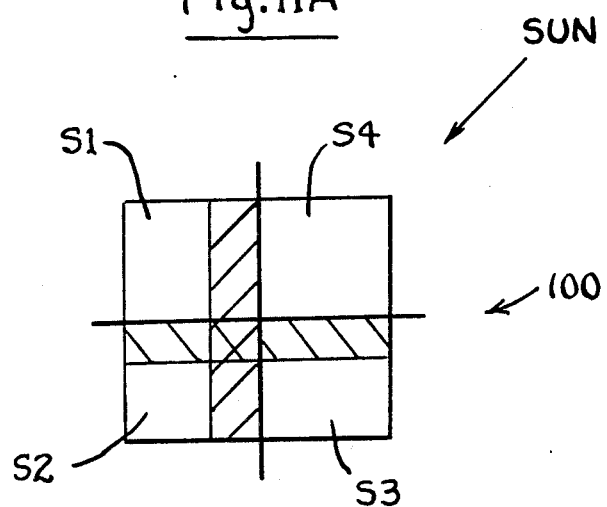

FIG. 11B illustrates the shading pattern which occurs when the sun is at other than the positions represented by FIGS. 11 and 11A. In FIG. 11B only one of the solar cells is completely illuminated. Thus for any given position of the sun, at least one of the solar cells will be unshaded. The automatic control system will provide a proper control function for these various shading conditions of the sun sensor.

FIG. 12 depicts a control arrangement wherein a determination is first made as to which one of the four cells is the brightest. This is done by a brightness selector circuit 120; even if more than one are essentially at full brightness, only one is selected.

Hence circuit 120 has four output lines 122, 124, 126, 128 corresponding to each solar cell and at any given time only the line corresponding to the brightest solar cell is activated. For a condition such as illustrated by FIG. 11B where the sun shines at an angle such that only one of the solar cells is fully illuminated, the shading of each the two immediately adjacent solar cells will be proportional to the angle of the sun as measured along the appropriate axis. Thus in the example illustrated, solar cell S4 is fully illuminated, the S1 solar cell will have a partial illumination pattern as shown, as will the solar cell S3. The amount of shading of solar cell S1 is related to the component angle of the sun as viewed in the direction of arrow 130 while the shaded area of cell S3 will be related to the angle of the sun as viewed in the direction indicated by arrow 132.

FIG. 13 illustrates the geometrical relationships involved between various parameters for the condition of FIG. 11B as viewed in the direction of the arrow 130. The relationship of the shaded to unshaded area of S1 is given by the following formula:

$$\frac{X_1}{X} = \frac{E_{S4} - E_{S1}}{E_{S4}}$$

where
$E_{S4}$ equals the output voltage of $S_4$ and
$E_{S1}$ equals the output voltage of $S_1$
and therefore the angle of the sun can be calculated as follows:

$$\theta = \arctan \frac{X_1}{h}, \text{ or}$$

-continued $$\theta = \arctan \frac{E_{S4} - E_{S1}}{E_{S4}} \left( \frac{x}{h} \right)$$

Similar computations apply for the angle component along the other direction.

Since each solar cell provides an output signal which is related to the area of it which is illuminated, the output signal from each solar cell can provide an indication of the corresponding amount of shading and in turn can lead to a calculation of the corresponding angle for the sun. With this information it is possible to adjust the position of the shading pattern in the liquid crystal roof panel to a position which is correlated with the sun's position in relation to a desired interior area to be shaded. In this way the opaqueness pattern in the roof panel is automatically positioned to maintain that shading as the sun tracks across the sky and/or the relative position of the vehicle in the relation of the sun changes.

In the event that the sun is coming from an angle which would cause two or more of the solar cells to be fully illuminated, it becomes possible by selecting either one of the two cells to perform the same type of calculations and produce the correct results. In other words, when two of the solar cells are fully illuminated it does not matter which of the two is selected since the calculation along one axis will indicate that the sun's rays are parallel to that segment of the fence which divides the two equally fully illuminated solar cells.

Similarly, when the sun is at the zenith and all four are equally illuminated the correct calculation will be obtained.

However, where the sun is so disposed as to fully illuminate only one of the solar cells it is important to know which solar cell is being illuminated so that a proper control function is achieved.

In this regard the sun sensor may be related with the general system previously described by FIG. 4 such that when the sun is at a given place, the opaqueness pattern is centered at a known reference location of the roof panel 22. The particular solar cell which is subjected to full illumination is used in the calculation of offsets which are added (algebraically) to the reference location so that the shade is automatically positioned to maintain shading of the desired interior area within the vehicle as the sun tracks across the sky and/or the orientation of the vehicle in relation to the sun changes.

FIG. 12 illustrates additional circuit components cooperatively associated with the four output lines of brightness selector circuit 120 for use in calculating the offsets. Each of the four output lines of brightness selector circuit 120 controls a pair of difference circuits. For example output line 122 controls the two difference circuits 140, 142.

Difference circuit 140 receives the voltages $E_{S1}$ and $E_{S4}$, and difference circuit 142 receives the voltage signals $E_{S1}$ and $E_{S2}$. When line 122 is activated to indicate that solar cell S1 is the brightest, the differences $E_{S1} - E_{S4}$ and $E_{S1} - E_{S2}$ are taken by the two circuits 140 and 142 respectively.

Because of the geometrical relationships involved in the illustrated sun sensor, the difference $E_{S1} - E_{S4}$ corresponds to a negative X offset while the difference $E_{S1} - E_{S2}$ corresponds to a positive Y offset. In other words for the condition where solar cell S1 is the brightest, the sun's rays are coming from the negative X and positive Y directions. In order to maintain a given interior area in the shade, the opaqueness pattern 30 must be offset in the negative X and positive Y directions. Hence the circuits 140 and 142 provide the correct polarity offsets in terms of the voltage differences, and this is indicated by the designations in the drawing Fig.

A divider circuit 140d, 142d associated with each difference circuit normalizes the respective absolute difference $E_{S1} - E_{S4}$ and $E_{S1} - E_{S2}$ respectively by dividing each difference by the factor $E_{S1}$.

Difference circuits 144 and 146 are activated when solar cell S2 is the brightest; difference circuits 148 and 150, when solar cell S3 is the brightest; and difference 152 and 154, when solar cell S4 is the brightest. Corresponding divider circuits 144d, 146d, 148d, 150d, 152d, and 154d normalize the various differences as shown. The corresponding directions of the offsets are indicated on the drawing FIG. 12 by the indicated polarities.

The outputs from that pair of difference circuits which are activated at any given time provide signals which can be digitized and supplied as inputs to the microprocessor. The microprocessor is programmed in any conventional way to perform the calculations of the formula to produce the correct polarity offset in each of the two directions. These offsets are added algebraically to the reference location, and the control acts upon the reference location, as modified by the offsets, to correctly position the opaqueness pattern in the liquid crystal sunroof panel so as to maintain shading of the desired interior area.

The implementation of the automatic mode of operation may be in conjunction with the manual controls as shown by FIG. 14. The manual controls can set the initial reference position of the opaqueness pattern to produce the desired interior shading. In other words, the occupant uses the joy stick control to position the opaqueness zone as he or she desires. A device such as a push button switch 160 may then be used to set the reference location. Actuation of switch 160 causes the values of the X and Y offsets which are being supplied at that particular time based upon the sun's position to be recorded. These recorded offsets constitute a point of reference and are shown to be recorded in stores 162, 164. Now as there are changes in the relationship between the sun and the vehicle, the actual offsets from whichever pair of difference circuits is activated are modified by the recorded point of reference in stores 162, 164 by means of modifying circuits 166, 168 so that the actual signals developed by the microprocessor are adjusted by the point of reference for use in ensuing automatic positioning of the opaqueness pattern to maintain the desired shaded interior area set by the manual control.

It is also possible to provide an automatic degree of opaqueness control whereby once a desired level of shading has been obtained for a given solar intensity, the control responds to changes in incident solar intensity to vary the opaqueness of pattern 30. In other words, as the brightness of the sun increases, the opaqueness is darkened and when the brightness lessens, the opaqueness lightens. FIG. 14 also shown a photocell 170 sensing interior shading and as associated closed loop control 172 which can be activated by a switch 174 to override the manual density potentiometer. The control can be applied to the entire panel and/or to only particular zones, as desired.

Thus, a unique capability is imparted to a sunroof providing variable selective degrees of shading in particular interior areas of the vehicle.

FIG. 15 illustrates an alternate form on control which is designated by the general reference numeral 200, and it bears many similarities to the control 32 of FIG. 4. Like components in the two embodiments 32 and 200 are identified by like reference numerals and a detailed description of them will not be repeated here.

Control 200 of FIG. 15 differs from control 32 of FIG. 4 in that associated with each zone and phase modulator combination is an individual zone latch, or store. In the block diagram of FIG. 15 zone latches are collectively identified by the reference numeral 202.

The microprocessor performs calculations in the same, or analogous manner, as described above, and the control has the capability for producing shading patterns other than a square or rectangular pattern as provided by control 32.

FIGS. 16 and 16A illustrate a further aspect which may be embodied in application of the invention. By making the transparent conductors 28 in the liquid crystal panel such that they possess a "lossy" characteristic, the more remote a zone 26 is from the point at which voltage is applied to the corresponding conductor, the less energizing voltage it will receive. In the case of a nematic material this means it will be less opaque. By constructing a panel in a particular way to take advantage of the lossy characteristic it is possible to produce patterns of opaqueness which are variable across their extent. The particular shading pattern which will be created through the use of lossy conductors depends upon the particular manner in which the panel is constructed. It is contemplated that various types of shading patterns may be developed which will be useful in the application to a sunroof panel in a motor vehicle.

It is possible to develop shading patterns other than the illustrated pattern by different geometrical arrangement of the zones and/or by different techniques for selectively energizing the individual zones. For example, it is possible to develop other than a square or rectangular shape for the shading pattern. A circular, elliptical or other shape pattern can be developed.

While a preferred embodiment of the invention has been disclosed, it will be appreciated that principles of the invention are applicable to other embodiments.

What is claimed is:

1. In combination with an interior occupant space, a shading system for selectively shading the interior occupant space comprising a panel disposed in a wall bounding said space, said panel comprising a two dimensional array pattern of individual zones wherein both dimensions of said array pattern are spanned by plural zones, each zone comprising a medium which possesses an electro-optical characteristic wherein the degree of light transmission through the zone is correlated with magnitude of electrical potential applied to it, and a control for selectively controlling the light transmission of said zones to create a shade which is selectable, both in location and size, over both dimensions of the array pattern, said control comprising plural input means one of which controls the two dimensional area of expanse of the shade over the two dimensions of the array pattern and another of which controls the particular location of the shade on the array, and means operatively coupling said plural input means with the individual zones of the array for supplying electrical potentials to the zones to cause the shade to appear on the array in accordance with said one and said another input means.

2. In combination with an interior occupant space, a shading system for selectively shading the interior occupant space comprising a panel disposed in a wall bounding said space, said panel comprising a two dimensional m × n array of individual zones of a panel, m and n being integers greater than unity, each zone comprising a medium which possesses an electro-optical characteristic wherein the degree of light transmission through the zone is correlated with the magnitude of electrical potential applied to it, and a control for selectively controlling the light transmission of said zones to produce a shade which is selectively positionable on said panel, in which said control and said zones are so arranged and constructed to produce said shade as a two dimensional area of opaqueness on said panel, including an operator controlled input for selectively positioning said two dimensional area of opaqueness over the two dimensions of the array, in which said operator controlled input comprises a joy stick control, and in which said joy stick control comprises an operating handle which is so arranged in relation to said two dimensional area of opaqueness as to point toward a selected point of said two dimensional area of opaqueness and the control is effective as the joy stick handle is operated to maintain the selected point of said two dimensional area of opaqueness in substantial alignment with the direction in which said operating handle points.

3. In combination with an interior occupant space, a sun shading system for selectively shading the interior occupant space comprising a panel disposed in a wall bounding said space, said panel comprising a two dimensional m x n array of individual zones of a panel, m and n being integers greater than unity, each zone comprising a medium which possesses an electro-optical characteristic wherein the degree of light transmission through the zone is correlated with the magnitude of electrical potential applied to it, and a control for selectively controlling the light transmission of said zones to produce a sun shade which is selectively positionable over two dimensions on said panel, including a sensor for sensing incident sunlight and means for automatically positioning the shade in accordance with the direction of incident sunlight, in which said sensor comprises individual photosensitive elements arranged in a predetermined two dimensional array pattern in correlation with the two dimensions of the array and means cooperatively associated with said individual elements to provide for selective shading of the elements in accordance with the direction from which the sunlight is incident on the sensor, and said control comprises means which positions the shade over the two dimensions of the panel in correlation with the direction of incident sunlight as determined by the selective shading of said elements.

4. A shading system as set forth in claim 1 in which said one input means comprises a joy stick control.

5. A shading system as set forth in claim 4 in which said joy stick control comprises an operating handle which is so arranged in relation to said two dimensional array pattern as to point toward the center of the shade and the control is effective as the joy stick handle is being operated to maintain the center of the shade in substantial alignment with the direction in which said operating handle points.

6. A sun shading system as set forth in claim 3 in which the sensor comprises an array of four such photosensitive elements arranged in quadrants, and an opaque fence disposed in a plane perpendicular to the plane of the individual photosensitive elements and dividing them from each other.

7. A shading system as set forth in claim 1 in which said zones and said control are so constructed and arranged to produce said shade as a rectangular area of opaqueness.

8. A shading system as set forth in claim 6 in which said control includes means receiving signals from the individual photosensitive elements and developing further signals correlated with components of the angular relationship of the incident sunlight on the sensor.

9. A shading system as set forth in claim 1 in which the array pattern comprises a rectangular m×n array of said zones wherein m and n are integers greater than unity, and said control comprises a series of m+n stores which are respectively correlated with the m dimension and the n dimension of the array and are individually selectively settable, means for establishing the intersection of those m stores which are set and those n stores which are set, and means for causing the zones at the intersection of the set m and the set n stores to produce the shade.

10. A shading system as set forth in claim 9 in which said control includes phase modulator circuits under the control of said stores operatively coupled between the stores and the zones of the array.

11. A shading system as set forth in claim 1 including a sensor for sensing incident light conditions and means for automatically positioning the shade in accordance with the incident light conditions, said sensor comprising individual photosensitive elements arranged in a predetermined two dimensional pattern in relation to the array pattern and means cooperatively associated with said individual elements to provide for selective shading of the elements in accordance with the direction from which light is incident on the sensor.

12. A shading system as set forth in claim 11 in which the sensor comprises an array of four such photosensitive elements arranged in quadrants, and an opaque fence disposed in a plane perpendicular to the plane of the individual photosensitive elements and dividing them from each other.

13. A shading system as set forth in claim 12 in which said control includes means receiving signals from the individual photosensitive elements and developing signals correlated with components of the angular relationship of the incident light on the sensor.

* * * * *